Aug. 24, 1937. E. RISZDORFER Re. 20,486

ARRANGEMENT FOR THE AUTOMATIC REGULATION OF THE LENGTH OF TIME OF EXPOSURE IN TAKING PHOTOGRAPHIC PICTURES

Original Filed Oct. 23, 1930 4 Sheets-Sheet 1

INVENTOR.
Edmond Riszdorfer
BY Rollo N. Carter

ATTORNEYS.

ARRANGEMENT FOR THE AUTOMATIC REGULATION OF THE LENGTH OF TIME OF EXPOSURE IN TAKING PHOTOGRAPHIC PICTURES

Original Filed Oct. 23, 1930 4 Sheets-Sheet 2

Inventor
Edmond Riszdorfer
BY Rolla N. Carter

ATTORNEYS.

Aug. 24, 1937. E. RISZDORFER Re. 20,486

ARRANGEMENT FOR THE AUTOMATIC REGULATION OF THE LENGTH OF TIME OF EXPOSURE IN TAKING PHOTOGRAPHIC PICTURES

Original Filed Oct. 23, 1930 4 Sheets-Sheet 3

Inventor
Edmond Riszdorfer
BY Rolla H. Carter

ATTORNEYS.

Aug. 24, 1937. E. RISZDORFER Re. 20,486

ARRANGEMENT FOR THE AUTOMATIC REGULATION OF THE LENGTH OF TIME OF EXPOSURE IN TAKING PHOTOGRAPHIC PICTURES

Original Filed Oct. 23, 1930 4 Sheets-Sheet 4

Inventor
Edmond Riszdorfer
BY Rolla N. Carter

ATTORNEYS.

Reissued Aug. 24, 1937 Re. 20,486

UNITED STATES PATENT OFFICE 20,486

ARRANGEMENT FOR THE AUTOMATIC REGULATION OF THE LENGTH OF TIME OF EXPOSURE IN TAKING PHOTOGRAPHIC PICTURES

Edmond Riszdorfer, Budapest, Hungary

Original No. 1,974,433, dated September 25, 1934, Serial No. 490,766, October 23, 1930. Application for reissue January 10, 1936, Serial No. 58,607

7 Claims. (Cl. 95—10)

The invention relates to an arrangement for the automatic regulation of the length of time of exposure in taking photographic pictures, for which purpose a photo-cell is employed.

According to the invention resistances are provided in the circuit operating the automatic control of the object lens shutter or respectively of the diaphragm, one of which resistances is positively connected with the diaphragm or respectively with the shutter, such diaphragm or respectively shutter being adjustable by hand, whilst a second resistance is adjusted so as to suit the degree of sensitivity of the photographic plate and a further number of resistances serve to effect the necessary final adjustments.

In the accompanying drawings like characters of reference indicate like parts in the several views and Figure 1 is a perspective view, partly broken away, showing a camera equipped with one form of the invention.

Figure 1:
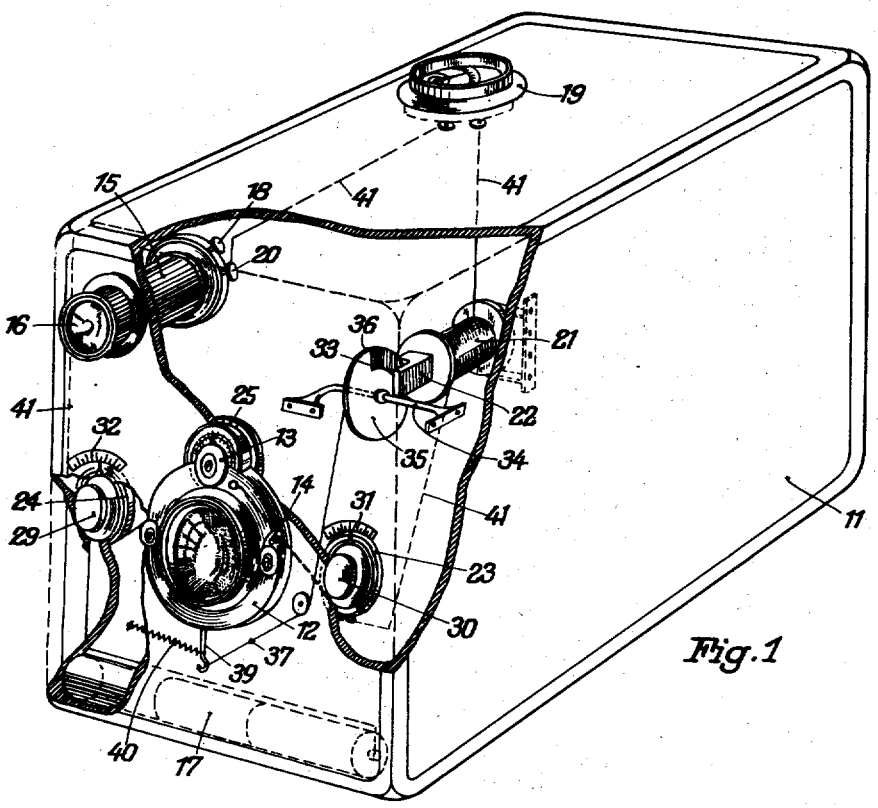

In Figure 1, 11 is the casing of the photographic camera in which the object lens with the customary shutter and the casing 12 of the latter are housed. 13 is the usual regulating disk for the shutter speed and 14 the usual releasing lever. Arranged in the camera is a light sensitive cell 15 into which the light is admitted through the lens 16. Cell 15 is connected to a source of current 17 such as the battery by means of a wire 41′ leading to a terminal 18. Connected in series with the other terminal 20 of the cell are the ammeter 19, the coil 21 of an actuating magnet 22 and the regulating variable resistances 23, 24 and 25. Of these, the sliding contact 26 of resistance 25 is positively connected with the disk 13 for the regulation of the shutter speed. The sliding contacts 27 and 28 of the resistances 24 and 23 are regulated by means of handles 29 and 30. The value of resistance that has been connected is shown by the scales 31 and 32. The arcuate armature 33 of the magnet 22 is carried by a disk 35 rotatably mounted on the shaft 34.

Figure 2:
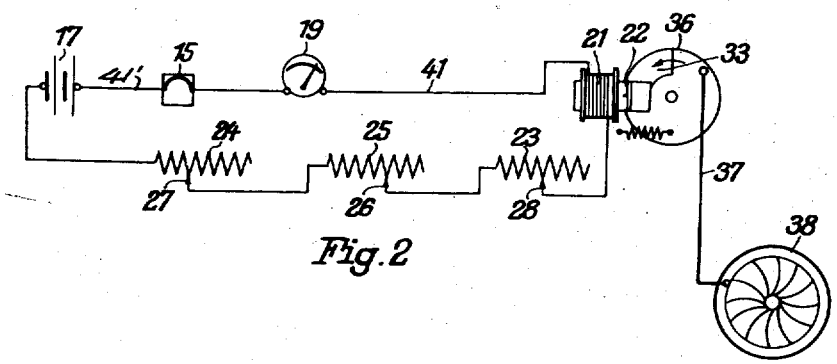
Figure 2 is a wiring diagram for the invention as disclosed in Figure 1.

Disposed in the groove 36 of the disk 35 is a thread 37 which is connected to the lever 39 which regulates the diaphragm 38 (Fig. 2) and which acts to operate this lever, the action of the armature being resisted by the spring 40. Before exposure, resistance 23 is regulated according to the light sensitiveness of the emulsion used for the purpose. For this purpose, the scale 31 is preferably graduated according to the Scheiner-Graden scale or according to some other suitable scale, in such fashion that when a setting is made for increased light sensitiveness, there will be less resistance, and that when a setting is made for reduced light sensitiveness, there will be more resistance (23) in the circuit of the cell 15. After that, the desired shutter speed is regulated by means of disk 13 whereby, because of the automatic carrying off of contact 26 proportionately more resistance 25 will be in the circuit of the cell 15 at high speeds and proportionately less resistance 25 at low speeds. The intensity of the current which then flows through the circuit corresponds to the resistances that are connected, which current then regulates the disk 35 of the rotating magnet 22 according to its strength. The smaller the light sensitiveness of the emulsion and the larger the shutter speed that has been set, the larger will be the resistance and the smaller will be the current in circuit 41 and so much less will the diaphragm be contracted by the pull of 37. The larger the light sensitiveness and the smaller the shutter speed, the smaller will be the resistance and the stronger will be the current in circuit 41 and the larger will be the contraction of the diaphragm through the pull of 37. Resistance 24 is a regulating resistance which should be connected at all times.

Figure 3:
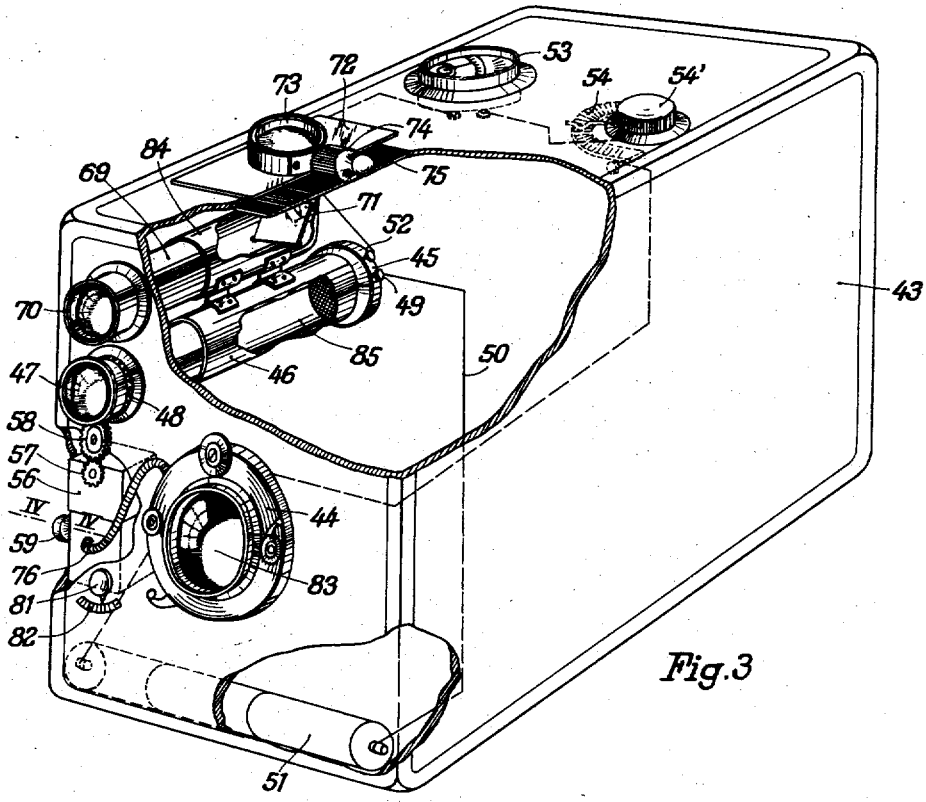
Figure 3 is a perspective view, partly broken away, showing a second form of the invention.
Figure 4:
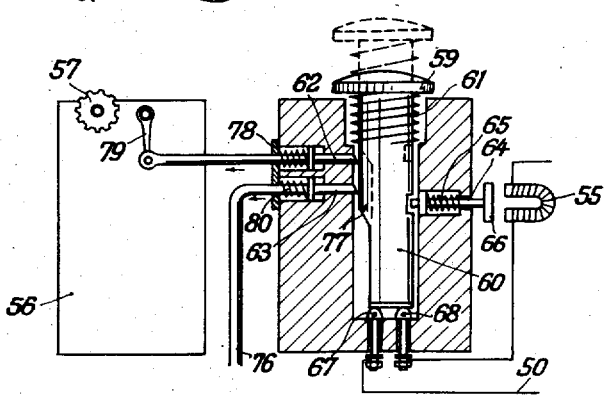
Figure 4 is a detail view, partly in section, of certain elements used in the form shown in Figure 3.
Figure 5:
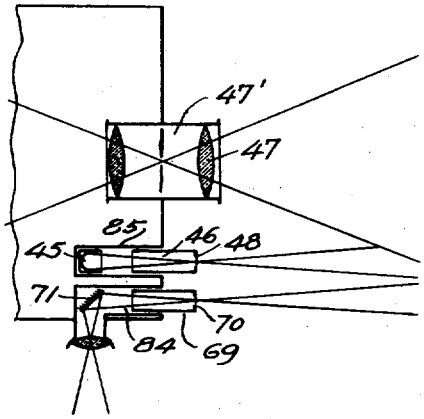
Figure 5 is a diagrammatic view of one arrangement of the device as shown in Figure 3.
Figure 6:
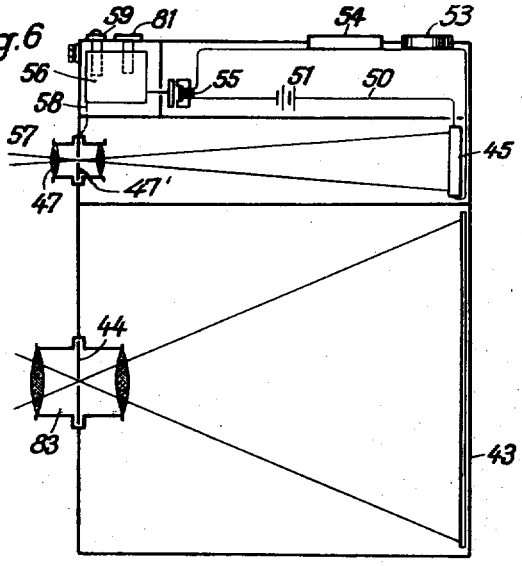
Figure 6 is a diagrammatic view showing a somewhat different arrangement of the parts of Figure 3.

In the arrangement shown in Figure 3, which is well adapted for time exposures, 43 is the casing wherein is supported the mounting for the shutter, object lens 83 and the diaphragm, these parts being of usual construction. A photo-cell 45 is arranged in the telescopic tube 46 and is exposed through the lens 47. Arranged behind this lens 47 is an iris diaphragm 47′ as shown in Figure 6. This diaphragm is opened and closed by means of a toothed wheel 48 and is completely shut before and after exposure. One of the terminals 49 of the photo-cell is connected with the source of current 51 by means of a wire 50. The other terminal 52 is connected in series with the ammeter 53, the regulatable resistance 54 and with the other pole of the source of current 51 through the electro-magnet 55 (Figures 4 and 6). 56 is a clock work mechanism arranged in the casing 43. This clock work mechanism operates the diaphragm 48 of the photo-cell 45 by means of toothed wheels 57 and 58. The control for the mechanism is shown in Figure 4. To start the mechanism, the button 59 is pushed down. The button 59 carries a bolt 60. Figure 4 shows the button 59 in pressed-down position in full lines and raised in dotted lines. The bolt 60 of the button, after the resistance of the spring 61 has been overcome, moves into its pressed down position, in which it presses against pins 62 and 63, whose function will be hereinafter more fully explained. 64 is a locking pin which, through the pressure of the spring 65, is urged into locking position, but which is retracted out of such locking position, when the current becomes sufficiently strong by means of an electro-magnet 55 which acts upon the bolt head 66 functioning as an armature. The bolt 60 in its pressed-down position, closes the circuit 50 by means of contacts 67 and 68 and breaks the circuit by moving upwardly when locking bolt 65 is being retracted.

Connected to the telescopic tube 46 of the photo-cell is a second telescopic tube 69. In other words, the slidable tube members 84 and 85 of the said telescopic tubes are attached to each other. The two tubes are arranged parallel to each other. Telescopic tube 69 has at its front end a lens 70. In its back portion the telescopic tube 84 is provided with a small mirror 71 and is connected to a slide 72 which is slidingly arranged on the outer wall of the camera. Disposed in a hole of the slide above the mirror is a search-lens 73. The slide 72 can be shifted in the direction of the axis of the tube 69 with the result that the mirror 71 can be moved closer to or further away from the lens 70. The tube 85 of the photo-cell automatically participates in this shifting motion. The shifting is done by means of a pinion 74 which engages a rack 75. The control device mounted on the casing 43 adjacent the slide 72 is, by means of the flexible shaft 76, connected with the releasing mechanism of the shutter of the object lens. This release mechanism is of the usual type wherein the pressure of a button releases the shutter.

The tension of the spring of the mechanism 56 is regulated through turning of the knob 81. The pointer of the knob 81 moves over a scale 82. Tensioning of the spring of the mechanism or clockwork controls the working speed of the clock work. The larger the opening width of the diaphragm (of object lens 83) used for the exposure the more the spring of the clock work will be tensioned. To facilitate the operation it is advisable to graduate the scale 82 in conformity with the opening diameters of the diaphragm to be selected.

The apparatus described in the present application is constructed for time exposures, i. e. particularly for use in studios, and operates as follows:

After the diaphragm of the object lens 83 has been set and the spring tensioned through turning the knob 81, the button 59 is pushed down, whereupon the stop 77 of the bolt 60 forces the pin 62 against the spring 78 in the direction of the arrow, causing thereby the lever 79 to swing to the left and to start clock work 56. When the bolt 60 continues its downward movement, the pin 63 is pushed by the stop 77 against the spring 80 and is likewise forced to the left. The pin 63 actuates a flexible shaft 76 by means of which the shutter of the object lens is released. At the same time, the circuit 50 is closed through contacts 67 and 68, and the clock work 56 begins to open, by means of toothed gear wheels 57, 58, 48, the completely closed diaphragm of the object lens 47 of the cell. The more the diaphragm is opened the stronger will be the current which flows through the circuit 50 of the photo-cell. When a predetermined strength of current is reached, the armature 66 is attracted by the magnet 55 and the bolt 60 is thereby released. The latter, by means of the spring 61, is forced back into its dotted line position. At the same time, the pin 63 is forced back to the right by spring 80 whereby the shutter of the camera is closed. And also the pin 62 is forced back to the right by the spring 78, whereby the clockwork is stopped and the diaphragm of the object lens 47 of the cell is completely closed. The resistance 54 serves to regulate the circuit 50.

In case of exposures in which the object to be photographed shows considerable differences in brightness the photo-cell should be adjusted only to the dark portions of the picture. The pair of tubes 84, 85 should therefore be adjusted by means of the driver 74, 75 to reduce the angle of the picture until only the dark portions remain visible in the search lens 73. In this way the exposing time is lengthened. Less light will get into the cell, and the current in the circuit 50 will increase slower in intensity.

The element of the apparatus which is to be regulated automatically, for instance the diaphragm or the shutter of the object lens, may be controlled also by means of a special electric circuit, whereby such circuit is connected or disconnected by a relay actuated by the current of the light sensitive cell. The relay is so constructed that the regulating action for instance the time of the actuation of the regulating mechanism, depends upon the intensity of the current of the cell, that is to say, upon the degree of brightness. The relay is, therefore, provided with a contact element which is movably, for instance turnably, mounted, and which is moved in proportion to the intensity of the current of the cell, with the result that the turning of the contact increases in accordance with the intensity of the current of the cell, in a similar manner as this is the case in measuring instruments. The counter contact may either likewise be constructed as a movable contact or, under certain conditions, be of the stationary type as hereinafter described. It is important that the regulating action depends upon the degree of turning of the first contact, which moves in proportion to the intensity of the current of the cell. This interdependence is obtained by the arrangement that this contact controls the circuit of the regulating mechanism. The regulating action, that is to say, the regulating mechanism, can either be started by hand, in which case it will be interrupted or arrested by the contact actuated by the current of the cell in a certain position (corresponding to the degree of brightness) of the element to be regulated. Or the regulating action is started by this contact and interrupted after the element to be regulated has reached the desired position.

Generally speaking, it can be said that, regardless of whether the regulating action has been started by the relay or by other means, the regulating is interrupted when the contact controlled by the current of the cell has reached its outermost position corresponding to the intensity of the current and in this position produces a contact or interrupts an already existing contact.

The interdependence between the regulating action and the intensity of the current of the cell can be established in various ways by means of two movable contacts. In this case, each time one of the contacts of the relay is moved (measured from its starting position) according to the degree of intensity of the current in the circuit of the cell. The second contact, which is arranged in the path of the first mentioned contact, may be actuated by the regulating mechanism of the element to be regulated, for instance by a clock work or an electro-motor which operates the diaphragm. The contact moved by the current of the cell takes up its position at a distance from its zero position which is proportionate to the intensity of the current of the cell. It is at this last mentioned position that the second contact which is actuated by the regulating mechanism meets the first contact which is moved by the current of the cell, whereupon the regulating action is interrupted.

The second movable contact may also be constructed so that it is carried off by the first contact. The first movable contact is moved each time for a distance which is proportionate to the intensity of the current in the circuit of the cell. The contact with the second contact is established at a predetermined minimum intensity of current, whereupon if the current of the cell further increases in intensity the second contact is taken along by the first contact, while at the same time the circuit remains closed. There now are several possibilities of controlling a regulating mechanism which is started through the establishment of contact between the two movable contacts in dependence upon the length of the path at which the first contact meets and carries off the second contact. Since, however, this path is each time proportionate to the intensity of the current of the relay it is quite possible to also produce in this way an interdependence between the intensity of the current of the relay and the course of the started regulating action.

In this case the second movable contact may be actuated by a driving mechanism, for instance a clockwork, would be started through the establishment of contact between the two contacts, and arrested after the contact has been broken. It is also quite possible to use an electrical driving mechanism which is actuated by the operating current. In an arrangement like this, the circuit of the operating current is interrupted when the first contact has swung out as far as is possible at the existing intensity of the current of the cell and stops. There also can be provided means which guide the second contact into its starting position in case the first contact moves back into its starting position.

The element to be regulated is actuated by a regulating mechanism which is started through the establishment of contact between the two contacts and which remains active as long as the contact exists, i. e. as long as the working circuit remains closed. For the actuation of the element to be regulated, for instance the diaphragm, and for the actuation of the second contact a common driving means, for instance a clockwork may be used. This driving means remains active during the time of contact, with the result that the element to be regulated is actuated in proportion to the extent of the displacement of the contacts.

Another form of the arrangement would be to also provide the light sensitive cell with a diaphragm and to regulate this diaphragm as well as the diaphragm of the camera by a common regulating mechanism which is controlled by the current of the cell, whereby the regulating action would start at an identical starting position, for instance the opened position. In an arrangement like this, the second contact of the relay is preferably a stationary one and so arranged that at a minimum intensity of the current of the cell, predetermined through gauging, the contact is interrupted and the regulating action arrested.

Figure 7:
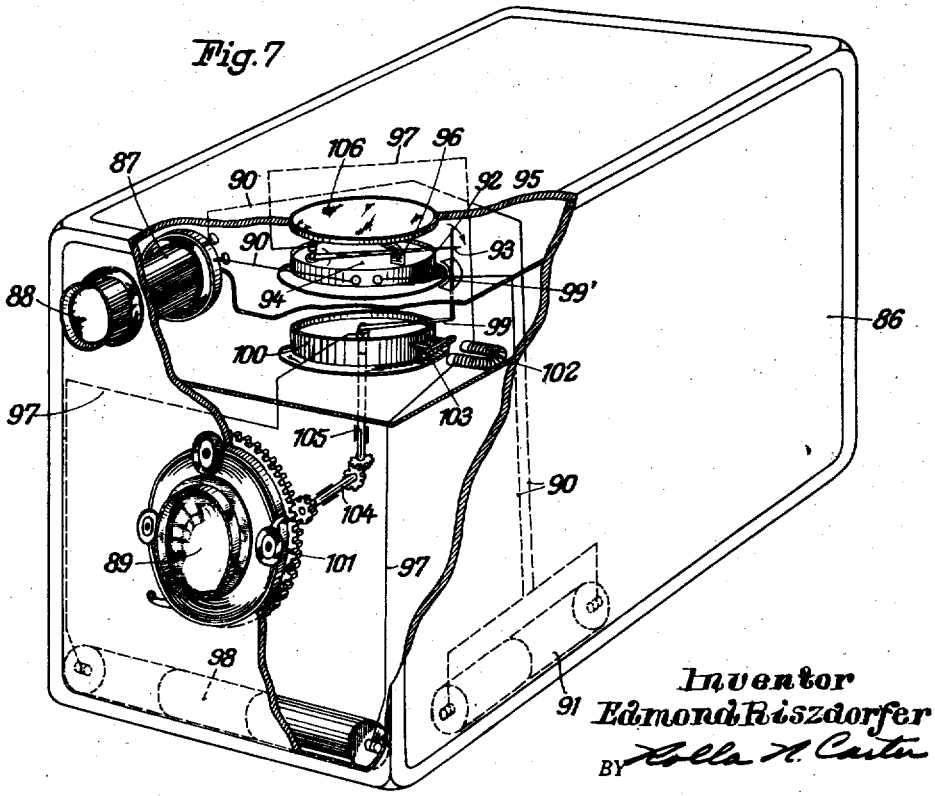
Figure 7 is a view similar to Figure 1 but showing a further modification of the invention.
Figure 8:
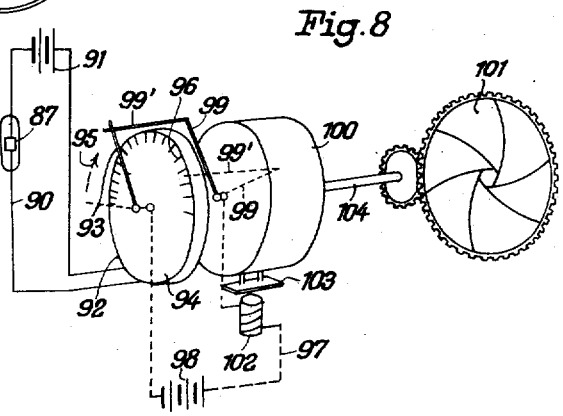
Figure 8 is a diagrammatic view of the parts shown in Figure 7.

In the arrangements shown in Figs. 7 and 8, the current of the photo-cell 87, arranged in the casing 86 and upon which the light is cast through the lens 88, serves indirectly to regulate the diaphragm ring 101 of the object lens 89, which in its position of rest is completely shut. The circuit 90 of the cell is energized by the battery 91. Arranged in this circuit is a relay 92 having a movable contact 93. The latter is shaped like a pointer and is, in known manner, moved by a moving coil, housed in the casing 94 from its zero position in the direction indicated by the arrow 95. This movement can take place over a scale 96. Contact 93 is arranged in a circuit 97, which is energized by a battery 98. The counter contact 99 is likewise a movable contact and is actuated by the regulating mechanism 100 of the diaphragm ring 101. The counter contact 99, like the contact 93, is shaped like a pointer, and contact between the two is established at the bent end 99'. The contacts 93 and 99, 99' are coaxially journaled. The regulating mechanism 100 is a clockwork. The clock work is controlled by a magnet 102, which acts upon the armature 103 controlling an arresting means. The arrangement is thus similar to that shown in Figure 4. Regulating mechanism 100 controls the diaphragm 101 by means of toothed wheels 104 and 105. An observation window is indicated by the numeral, 106.

The contact 93 is out of action in its end position at the left and the contact 99 is out of action at its end position on the right. These end positions are shown in dotted lines in Figure 8. First, the cell 87 is exposed to the light whereupon contact 93 begins to move. The degree to which contact 93 swings around; in other words, the position of contact 93, corresponds to the intensity of the current of the cell. When the clockwork 100 is started by hand it will begin to open the diaphragm ring 101 out of its completely closed position until the contact 99 reaches the contact 93. When the contacts meet the circuit 90 is closed, the magnet 102 acts and the clockwork or regulating mechanism 100 is arrested. The intenser the brightness the smaller the opening diameter of the diaphragm will be set, and vice versa.

The arrangement may also be such that the diaphragm is normally completely opened and then steadily closed by the regulating mechanism. In this case both contacts are moved in the same direction, i. e. counter contact 99 will follow the contact 93 after the latter has been displaced. The intenser the brightness the further the contact 93 will swing out, and the smaller the opening diameter of the diaphragm will be, and vice versa.

Figure 10:
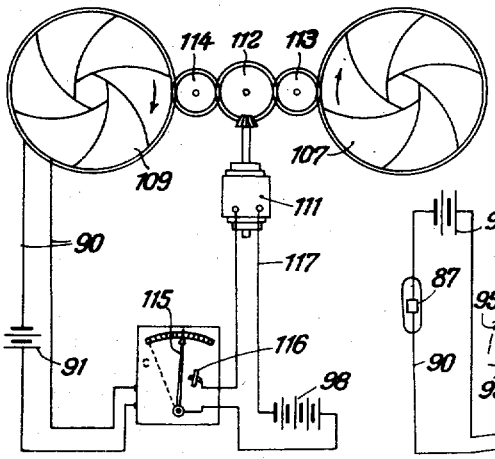
Figure 10 is a diagrammatic view of the form shown in Figure 9.
Figure 9:
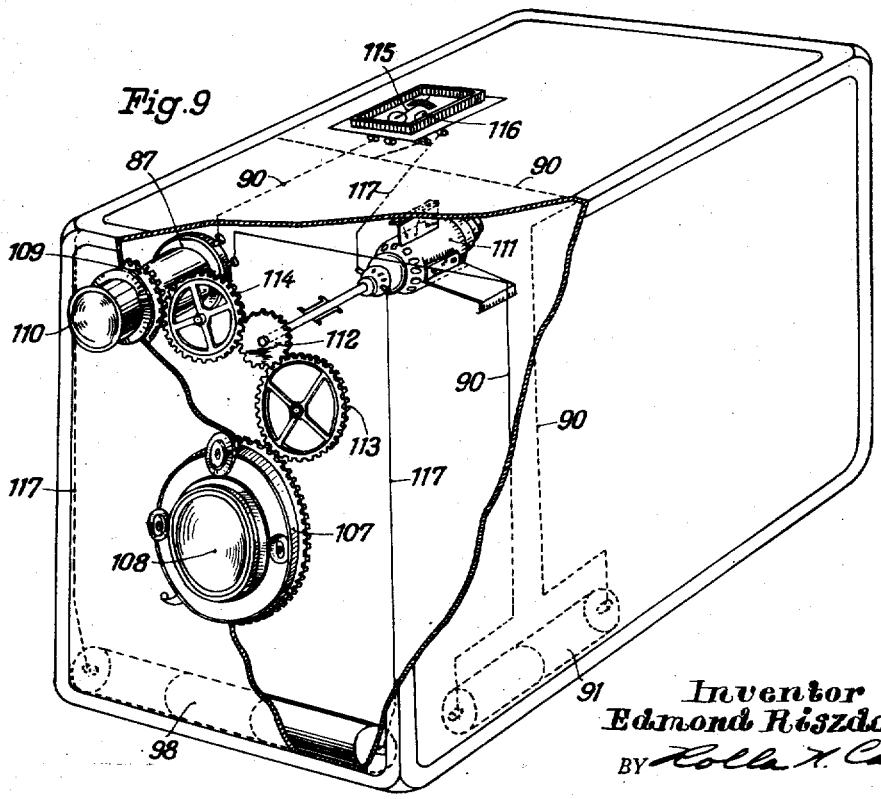
Figure 9 is a view similar to Figure 1 and showing a fourth form of the invention.

In the forms of construction shown in Figures 9 and 10, two diaphragms have been provided. The diaphragm 107 of the object lens 108 is for the exposure, while the diaphragm 109 regulates the cone of light which is cast through the object lens 110 into the cell 87. The regulating mechanism which controls both of the diaphragms consists of an electro-motor 111 and toothed gear wheels 112, 113 and 114. A relay, actuated by the circuit of the cell 87, has a movable contact 115 shaped like a pointer, and a stationary contact 116. The latter is arranged in the path of the contact 115 in a position whose distance from the zero-position, shown in dotted lines, is empirically ascertained, but which may also be variable. The motor 111 is energized by a source of current 98. When not in operation, both diaphragms are completely open. When the circuit 90 of the cell is closed, the contact 115 engages the contact 116 with the result that the circuit 117 is closed. Then the motor 111 begins to operate and moves (by means of the toothed gear wheels 112, 113, and 114) both diaphragms 107 and 109 in the direction of the arrows, that is, in closing direction, whereupon the supply of light to the cell, and accordingly also the current in the cell, is steadily reduced. When the current in the circuit 90 has been reduced to such an extent that the contact 115 swings away from the stationary contact 116, the regulating circuit 117 is interrupted and the diaphragms are not moved any further. Then the shutter of the camera is released by hand and the plate exposed.

The invention includes still further regulating possibilities. The regulation of the diaphragm can also be made to depend upon the setting of the shutter speed, or upon the sensitiveness of the plate, in short, upon all those values which influence the time of exposure. For this purpose, the position of the contacts may be changed in such manner that contact between them will be established according to requirement after a more or less extended deflection. For instance, the starting position of the counter contact as shown in Figures 7 and 9 may be changed and be made to depend upon the sensitiveness of the light sensitive emulsion used, or from the speed of the shutter, or the like. There also might be arranged in the circuit of the photo-cell regulating resistances (as shown in Figure 1) which are controlled in dependence upon the said values.

In all of the described examples, the element to be regulated has been the diaphragm of the object lens. However, the arrangement may just as well be such that the speed regulator of the shutter of the object lens is influenced by the regulating mechanism, in which case the ratio of gearing, the contact position, the resistance of the circuit of the cell, or the like, will be changed in dependence upon the selected opening width of the diaphragm. Means, for instance resistances, might also be arranged in the circuit of the light sensitive cell of the forms of construction shown in Figures 7–10, which resistances would change the intensity of current in this circuit according to the values not influenced by the current of the cell, for instance according to the shutter speed when the diaphragm is regulated by the cell, or according to the diaphragm when the shutter speed is regulated by the cell, or according to the sensitiveness of the plate, or according to the filters or the like that may be used.

I claim:

1. The combination with a camera having a variable diaphragm, a shutter, and means to regulate the speed of said shutter; of electro-magnetic means for regulating the extent of opening of the diaphragm, a light sensitive cell, a source of current, and means to connect the electro-magnetic means, cell and source of current in series, said connecting means including a variable resistance, and an operative connection between said resistance and the means to regulate the speed of the shutter.

2. The combination with a camera having a variable diaphragm, a shutter, and means to regulate the speed of said shutter; of electro-magnetic means for regulating the extent of opening of the diaphragm, a light sensitive cell, a source of current, and means to connect the electro-magnetic means, cell and source of current in series, said connecting means including a variable resistance, and an operative connection between said resistance and the means to regulate the speed of the shutter, said connecting means further including a second manually controlled variable resistance and a setting scale therefor arranged to indicate relative emulsion sensitivities.

3. The combination with a camera having a variable diaphragm, a shutter, and means to regulate the speed of said shutter; of electro-magnetic means for regulating the extent of opening of the diaphragm, a light sensitive cell, and an operative circuit including the electro-magnetic means and the cell, in series, and a variable resistance, and an operative connection between said resistance and means to regulate the speed of the shutter.

4. The combination with a camera having a variable diaphragm, a shutter, and means to regulate the speed of said shutter; of electro-magnetic means for regulating the extent of opening of the diaphragm, a light sensitive cell and an operative circuit including the electro-magnetic means and the cell, in series, and a variable resistance, and an operative connection between said resistance and the means to regulate the speed of the shutter, said circuit further including a second manually controlled variable resistance and a setting scale therefor arranged to indicate relative emulsion sensitivities.

5. In a portable photographic apparatus having an objective and two exposure controlling devices, viz., a shutter and a diaphragm for controlling the quantity of light passing through said objective, means for determining the correct exposure, comprising in combination an electro-magnetic device for regulating the setting of one of said exposure controlling devices, a light sensitive cell, a circuit connecting said cell and the electro-magnetic device, an adjustable resistance included in said circuit and means for adjusting said resistance in accordance with the setting of the other of said exposure controlling devices.

6. In a portable photographic apparatus having an objective and two exposure controlling devices, viz., a shutter and a diaphragm for controlling the quantity of light passing through said objective, means for determining the correct exposure, comprising in combination an electro-magnetic device for regulating the setting of one of said exposure controlling devices, a light sensitive cell, a circuit connecting said cell and the electro-magnetic device, an adustable resistance included in said circuit and positive transmission means connected to said adjustable resistance and to the other of said exposure controlling devices.

7. In a portable photographic camera having an objective and two exposure controlling devices, viz., a shutter and a diaphragm for controlling the quantity of light passing through the objective, means for determining the correct exposure comprising in combination a system including a light sensitive cell for regulating the setting of one of said exposure controlling devices and means for adjusting the constants of said system in accordance with the setting of the other of said exposure controlling devices.

EDMOND RISZDORFER.